United States Patent [19]

Gu et al.

[11] Patent Number: 5,248,205

[45] Date of Patent: Sep. 28, 1993

[54] FOIL THRUST BEARING WITH VARYING RADIAL AND CIRCUMFERENTIAL STIFFNESS

[75] Inventors: Alston L. Gu, Rancho Palos Verdes; Robert H. Nadjafi, San Pedro, both of Calif.

[73] Assignee: AlliedSignal Inc., Morris Township, Morris County, N.J.

[21] Appl. No.: 993,223

[22] Filed: Dec. 18, 1992

Related U.S. Application Data

[63] Continuation-in-part of Ser. No. 934,839, Aug. 24, 1992.

[51] Int. Cl.[5] ............................................. F16C 32/06
[52] U.S. Cl. ..................................... 384/106; 384/124
[58] Field of Search ........................... 384/103–106, 384/121, 124

[56] References Cited

U.S. PATENT DOCUMENTS

| | | |
|---|---|---|
| 3,375,046 | 3/1968 | Marley . |
| 3,635,534 | 1/1972 | Barnett . |
| 3,677,612 | 7/1972 | Barnett et al. . |
| 4,082,375 | 4/1978 | Fortmann . |
| 4,225,196 | 9/1980 | Gray .............................. 384/121 X |
| 4,277,111 | 7/1981 | Gray et al. ........................ 384/124 |
| 4,277,112 | 7/1981 | Heshmat ............................ 384/124 |
| 4,597,677 | 7/1986 | Hagiwara et al. ............. 384/106 X |
| 4,621,930 | 11/1986 | Gu et al. .............................. 384/105 |
| 4,624,583 | 11/1986 | Saville et al. ...................... 384/105 |
| 4,668,106 | 5/1987 | Gu ....................................... 384/105 |
| 4,701,060 | 10/1987 | Gu ....................................... 384/106 |
| 5,110,220 | 5/1992 | Gu ....................................... 384/105 |

Primary Examiner—Thomas R. Hannon
Attorney, Agent, or Firm—Joseph R. Black; James W. McFarland; Robert A. Walsh

[57] ABSTRACT

A spring cluster disc (14) for a foil thrust bearing (10) is provided with a plurality of sets (52) of springs (62,64,66). The springs are configured to provide varying spring force and thus varying stiffness in radial and circumferential directions.

10 Claims, 5 Drawing Sheets

FIG. 2
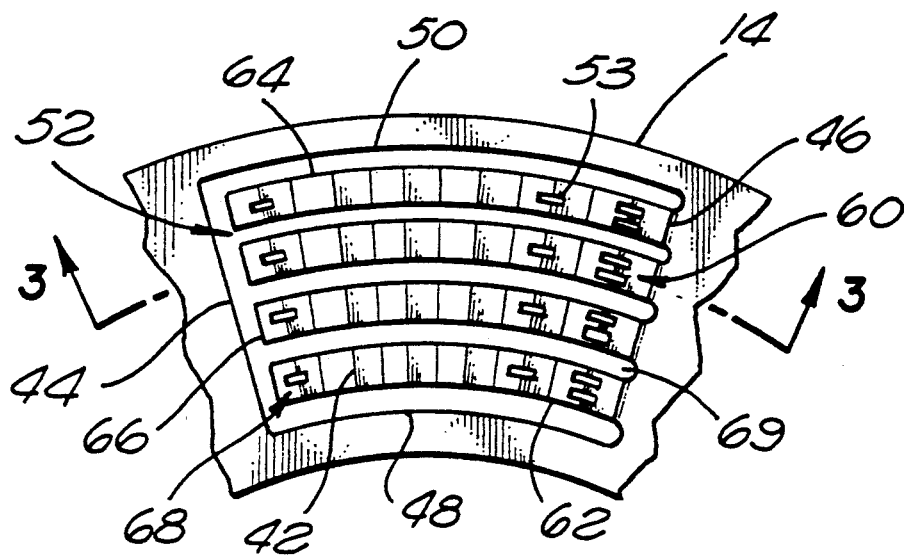
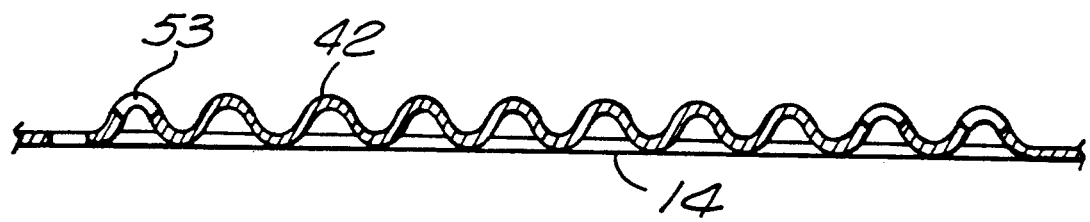
FIG. 3
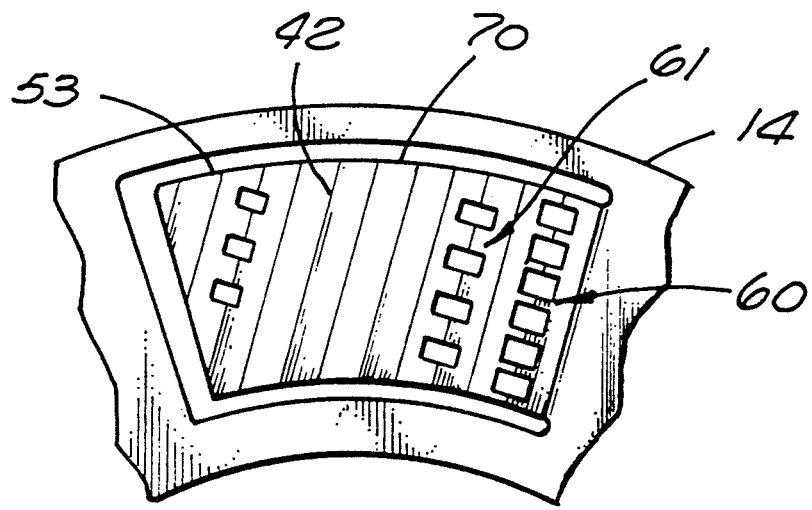
FIG. 4

FOIL THRUST BEARING WITH VARYING RADIAL AND CIRCUMFERENTIAL STIFFNESS

This is a continuation-in-part of pending application No. 07/934,839 (hereinafter, "the '839 application"), which was filed on Aug. 24, 1992. Both applications are owned by the same assignee.

TECHNICAL FIELD

This invention relates generally to bearings and, in order of increasing specificity, to hydrodynamic bearings, foil bearings, and foil thrust bearings.

BACKGROUND OF THE INVENTION

The load capacity of a foil thrust bearing depends on the compliance of the bearing with pressure exerted by a fluid film developed between the bearing and the runner. The pressure profile for a thrust bearing varies, and in order to accommodate the optimal pressure profile and attendant fluid film thickness associated with maximum load capacity, the thrust bearing should be designed to provide stiffness which varies in a manner similar to the pressure profile.

Current foil thrust bearings have limited load capacity. This limitation results from spring designs which indicate only a limited appreciation for variance in pressure profile and its effect on load capacity.

Typical spring designs are illustrated in U.S. Pat. No. 4,668,106 Gu. While such spring designs provide varying stiffness in radial directions, they provide limited load capacity because of excess pad deflection over the spring support points. The excessive pad deflection leads to a divergent fluid film at the trailing edge of the pad and prevents the bearing from developing an optimal pressure profile. Prior to the '839 application, a solution to this problem in the form of providing a spring design with varying stiffness in both radial and circumferential directions had gone unrecognized. The present invention is directed in one respect to spring designs which provide such variations in stiffness, and which offer both improved performance and greater facility in manufacturing.

A further complication arises in applications characterized by a circumferential pressure profile which exhibits a relatively gradual reduction near the trailing edge of the pad. It is believed that such a reduction will be more prevalent when the fluid is a liquid or high-pressure gas. In such applications, the spring design will be suboptimal to the extent that it does not provide for a commensurate reduction in stiffness near the trailing edge.

An objective of the invention is to provide spring cluster discs with stiffness variations which approximate pressure profile in both radial and circumferential directions.

A further objective is to provide spring cluster discs suitable for use in applications characterized by a relatively gradual reduction in circumferential pressure profile near the trailing edge of the foil pad.

A still further objective is to provide such discs with improved structural integrity.

Further objectives and advantages of the invention may be revealed by the following description, which includes the appended claims and accompanying drawings.

SUMMARY OF THE INVENTION

The invention provides a new type of spring cluster disc for foil thrust bearings. The disc is structurally adapted to provide stiffness which varies in both radial and circumferential directions.

In embodiments described herein, the invention also accommodates the above-described need to provide relatively gradual reduction in circumferential stiffness near the trailing edge of the pad. This is accomplished by providing a spring disc for which circumferential stiffness first increases and then decreases in the direction extending from the leading edge to the trailing edge of an associated foil.

BRIEF DESCRIPTION OF THE DRAWINGS

FIG. 2 is a fragmentary plan view of the spring cluster disc illustrated in FIG. 1. In both FIGS. 1 and 2, radial lines are used to indicate the crests of corrugations formed in spring structures.

FIG. 3 is a cross-sectional view taken along line 3—3 of FIG. 2.

FIG. 4 is a fragmentary plan view of an alternative embodiment of the spring cluster disc. As in FIGS. 1 and 2, lines are used to indicate crests of corrugations.

FIG. 7b is a partially cross-sectional and partially schematic view taken along line b—b of FIG. 7a.

DESCRIPTION OF THE PREFERRED EMBODIMENT

Figure 1:
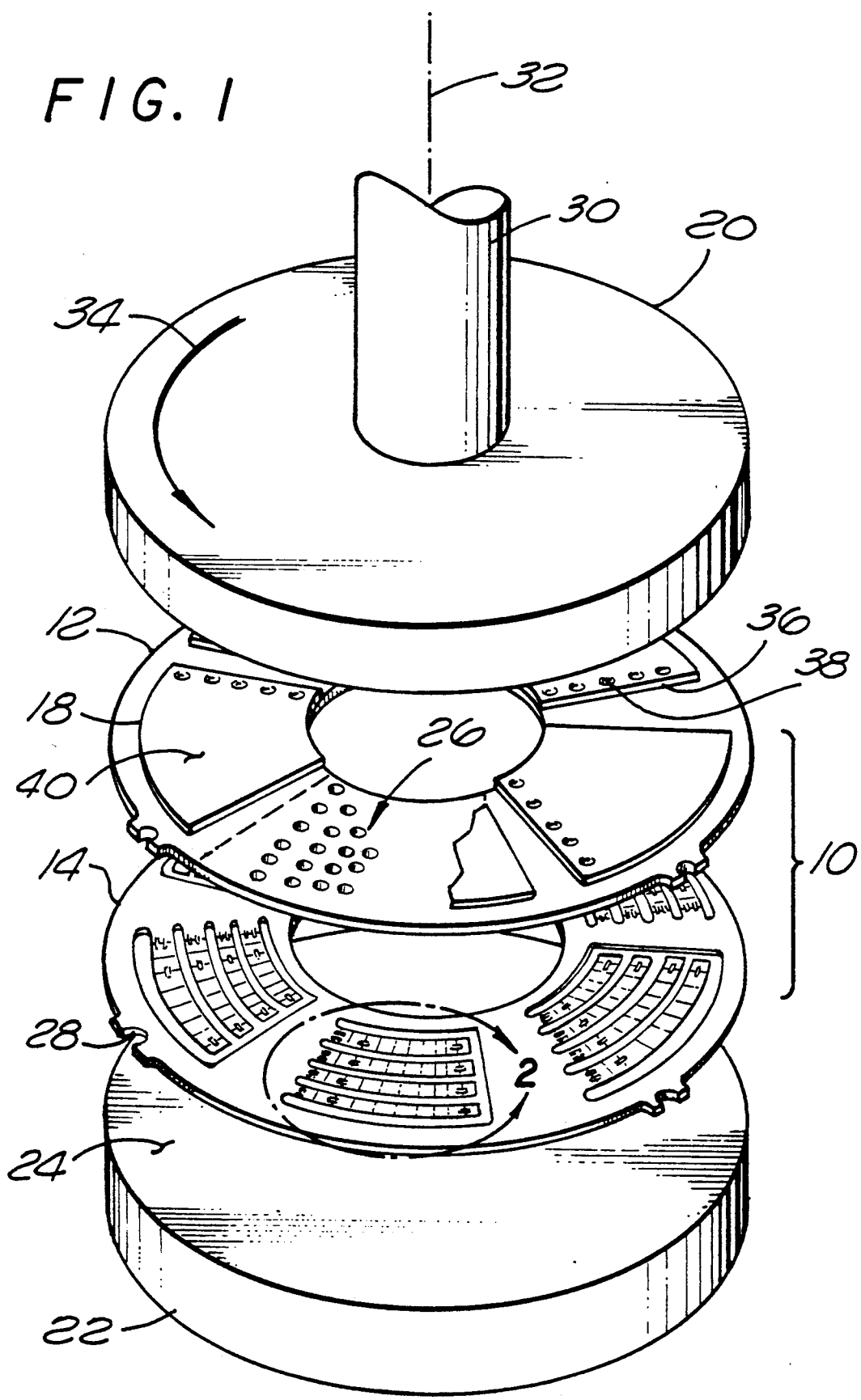
FIG. 1 is an exploded, partial perspective view of a foil thrust bearing embodying the invention, and also illustrates structural members with which the bearing is combined in use.
Figure 5:
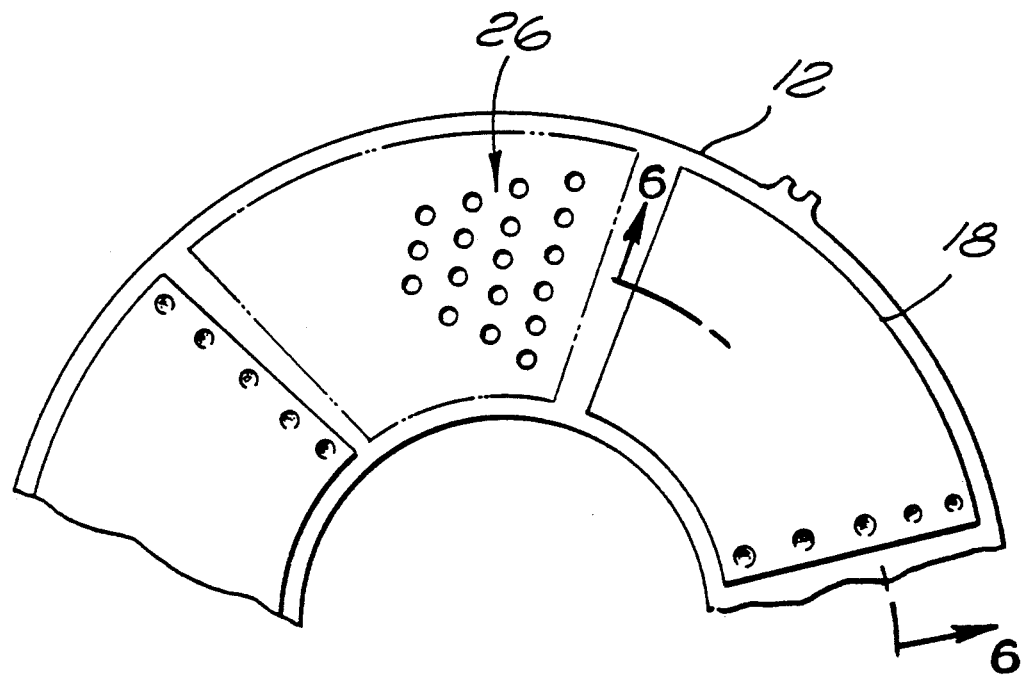
FIG. 5 is a fragmentary plan view of the stiffener disc illustrated in FIG. 1, showing certain features of the disc in phantom.
Figure 6:
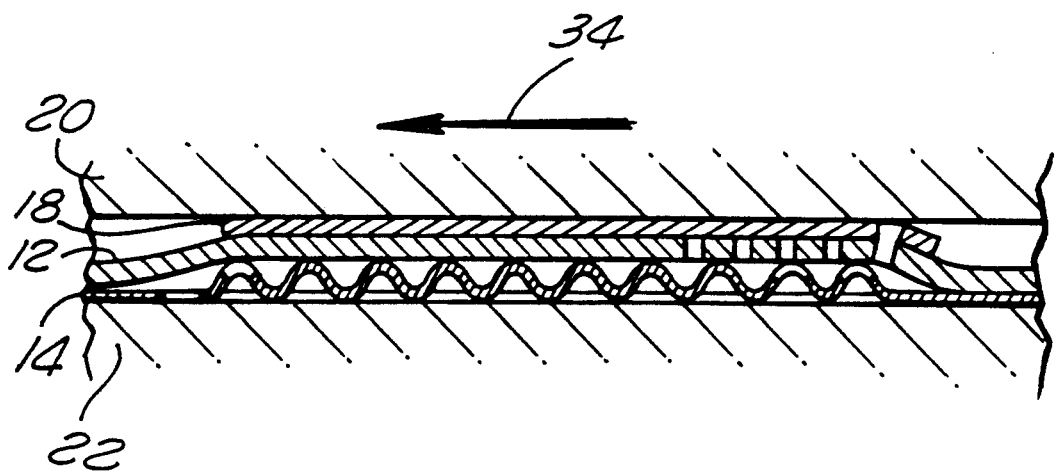
FIG. 6 is a partial cross-sectional view of the foil thrust bearing illustrated in FIG. 1, taken along line 6—6 of FIG. 5.

FIG. 1 illustrates a foil thrust bearing 10 comprised of a stiffener disc 12 (hereinafter, "stiffener"), a spring cluster disc 14 (hereinafter, "spring cluster"), and a plurality of compliant, trapezoidal foils or pads (as at 18). Typically, all components are made of conventional nickel-based alloys or stainless steel. However, the selection of materials is application-driven and could include iron-based, copper-based, or aluminum-based alloys, for example.

Figure 8:
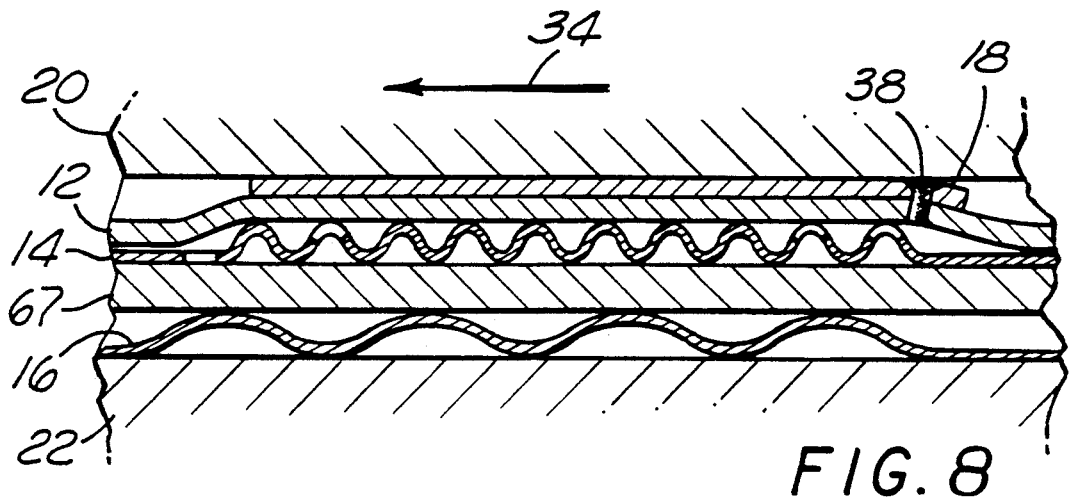
FIG. 8 is a cross-sectional view of the foil bearing partially illustrated in FIG. 1.

In use, the bearing 10 is positioned between a runner 20 and a thrust plate 22. The bearing 10 typically will further include a follower spring disc ("follower spring") 16 (FIG. 8) positioned between the spring cluster 14 and the thrust plate 22. The follower spring is typically corrugated throughout its circumferential range, with each corrugation converging in a radially inward direction toward the center of the disc, and is formed by stamping the disc in a forming die. The thrust plate 22 may be a separate unit as illustrated, but could also be a portion of a housing or other structural member which is rotationally stationary relative to the runner 20. The thrust plate 22 provides a flat surface 24 generally conformal with the two-dimensional shape of the bearing 10, and is adapted to receive anchoring pins (not shown) which in turn are received in slots (as at 28) in order to fix the rotational positions of the discs 12,14. The runner 20 is rigidly fixed to a shaft 30. The discs 12,14 and shaft define a common axis 32. In use, the shaft 30 rotates about the axis 32, the direction of rotation being indicated by the arrow 34.

The stiffener 12 and pads 18 may be of conventional design. Each pad 18 is fixed near its leading edge (as at 36) to the stiffener 12 by a radially extending plurality of weldments (as at 38). The leading edge 36 is defined by the rotational direction of the runner 20. For each pad 18, the surface (as at 40) that faces the runner 20 is slightly convex, whereas the opposite surface that faces the stiffener 12 is slightly concave. The desired curvature of these surfaces varies with the application, and depends upon the available starting torque in a given application. As indicated, the pads 18 are connected to the stiffener 12 such that the latter maintains the pads in collectively annular positional relation. In general, the pads 18 should be minimally spaced while still avoiding interference when flattened by post-startup fluid pressure. For reasons explained in the '839 application, apertures 26 (as opposed to arcuate slots) may be formed through the stiffener 12 to soften the latter as needed. The surfaces 40 are coated by conventional means with a solid lubricant.

Referring now to FIGS. 1 and 2, the spring cluster 14 is formed to provide a plurality of substantially trapezoidal areas equal in number to the pads 18. Each area is bounded by a leading radial-line segment (as at 46), a trailing radial-line segment (as at 44), a radially inner arcuate line (as at 48), and a radially outer arcuate line (as at 50). In use, the areas are registered with the foils 18 as indicated in FIG. 1.

Extending longitudinally from the leading radial-line segment 46 toward the trailing radial-line segment 44 of each trapezoidal area is a set 52 of arcuate springs. The word "set", as used herein in connection with arcuate springs, means the collective spring structure surrounded by the radial-line segments 44, 46 and the arcuate lines 48, 50. The spring sets 52 may be integral elements of the spring cluster 14, formed thereon by chemical etching. Alternatively, the springs may be individually or collectively formed by various conventional means and then welded or otherwise connected to the spring cluster 14 near the leading radial-line segments 46 thereof. Each spring is preferably corrugated as indicated in FIG. 3. The corrugations of adjacent springs may be radially aligned as depicted in the drawings, or may be aligned in a direction parallel to either the leading or trailing radial-line segments 46, 44 (see, e.g., FIG. 4).

In contrast with the earlier teaching of the '839 application, it is now believed that the loose ends of any corrugated spring configuration should be proximal to the trailing edge of the foil rather than the leading edge. This is believed to lower the likelihood of buckling and therefore improve the structural integrity of the bearing.

After an initial etching process in which the springs are formed to the desired widths and separated from the trailing radial-line segment 44, and in which rectangular slots (as at 53) are etched or machined through the springs, the springs are stamped in a forming die to form the corrugations. The slots 53 are formed through the crests 42 of the corrugations as indicated in FIG. 3. The circumferential length of the slots 53 is approximately one-half of the pitch distance (i.e. the distance between successive corrugations). The corrugations are relatively shallow (i.e. they have a relatively low height/wavelength ratio).

Referring to the embodiment of FIGS. 1-3, each set of springs 52 includes a radially innermost spring 62, a radially outermost spring 64, and one or more radially intermediate springs (as at 66), a total of four being illustrated in the drawing. However, it is preferable to provide as many springs in each set as is possible in view of dimensional constraints and manufacturing costs.

To provide stiffness variation, the number of slots 53 in a particular alignment thereof is varied. For example, in FIG. 2, there is an alignment 60 of eight slots near the leading radial-line segment 46. For slots of constant dimension, both radial and circumferential stiffness decreases as the number of aligned slots increases. Alternatively, or in combination with the method of varying stiffness by varying the number of aligned slots, stiffness variation can be achieved by varying the radial dimensions of slots in the circumferential direction. As is illustrated in FIG. 4, for example, there is an alignment 60 of six slots near the leading radial-line segment 46 which have a common radial dimension, and there is an alignment 61 of four slots having a common radial dimension which is lower than that of the slots in the adjacent alignment 60. For an alignment of slots of common circumferential dimension, both radial and circumferential stiffness decreases as the radial dimension of the slots increases. Note that in FIG. 2, radial stiffness along any given radial line increases in a radially outward direction by narrowing the gap (as at 69) between spring members. An equivalent result can be attained by successively narrowing the radial dimension of slots in an alignment so that the radially innermost slot has the highest radial dimension, whereas the radially outermost slot has the lowest radial dimension.

In applications demanding strong spring force, the springs may be supported by a backing disc 67 (FIG. 8) positioned between the spring cluster 14 and the follower spring 16. It will be understood that the follower spring 16 provides axial alignment and preload functions, and has less spring force than the spring cluster 14.

In operation, the bearing 10 is initially biased into contact with the runner 20 by coaction of the follower spring 16 and thrust plate 22. Upon startup, the runner 20 rotates in the indicated direction 34 relative to the pads 18 and a hydrodynamic film develops between the pads and runner. The fluid pressure associated with development of the film overcomes the opposing spring force associated with the follower spring, and the bearing 10 moves toward the thrust plate 22.

Figure 9:
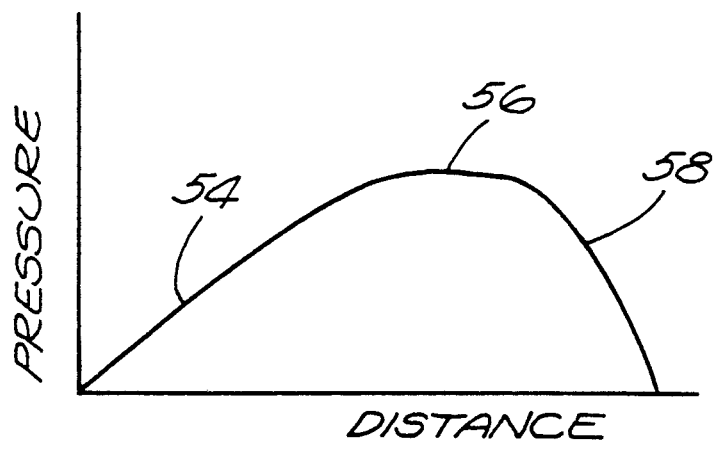
FIG. 9 is a graph illustrating the general relationship between the fluid pressure exerted on a foil by a fluid film and the circumferential distance along the foil, measured from the leading edge.
Figure 10:
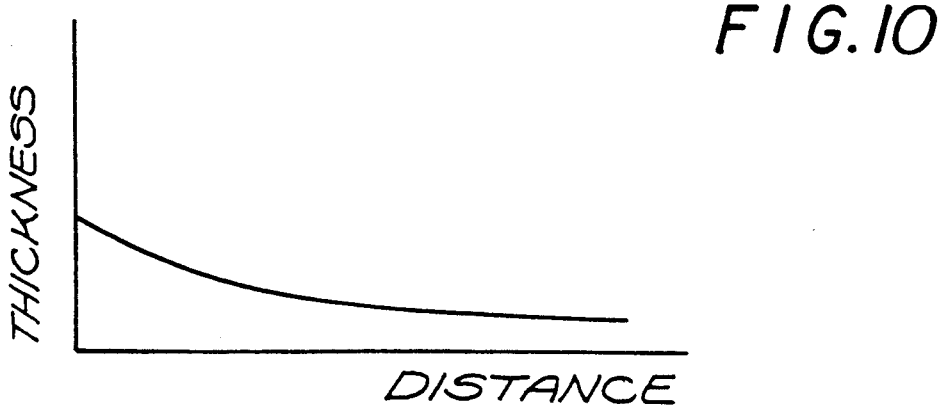
FIG. 10 is a graph illustrating the general relationship between the thickness of the fluid film and the circumferential distance along the foil.

To achieve optimal load capacity and to support the force exerted by the hydrodynamic film, the spring clusters are structurally adapted to provide a distribution of spring force that approximates the relationship between pressure and distance for the foils 18, and that does so in both radial and circumferential directions. For the circumferential direction, this relationship is generally illustrated in FIG. 9 for an application characterized by a relatively gradual reduction in circumferential stiffness near the trailing edge of the foil. The associated relationship between film thickness and distance is generally illustrated in FIG. 10. However, these relationships can be expected to vary among applications, and should be analytically derived for an given application. The general relationship between pressure and distance in the radial direction is known and is illustrated in the '839 application.

Viewing FIG. 9, there is a first circumferentially extending range 54 in which pressure is increasing, a second range 56 in which pressure is relatively constant, and a final range 58 near the trailing edge that is characterized by a relatively gradual drop in pressure. Thus, beginning with a first alignment 60 of slots near the leading edge of an associated pad and proceeding toward the trailing edge, the circumferential spring rate first increases, then increases again and is substantially constant over a circumferential range in which—in the illustrated embodiment—no slots are provided, and then decreases near the trailing edge by the provision of another alignment 68 of slots.

FIG. 4 illustrates an alternative form of spring cluster 14 in which all springs in a set 52 are formed on a single, integral spring member 70. The drawing also illustrates that variation in stiffness can be provided by varying the radial dimensions of the slots 53 from one alignment to another.

Figure 7A:
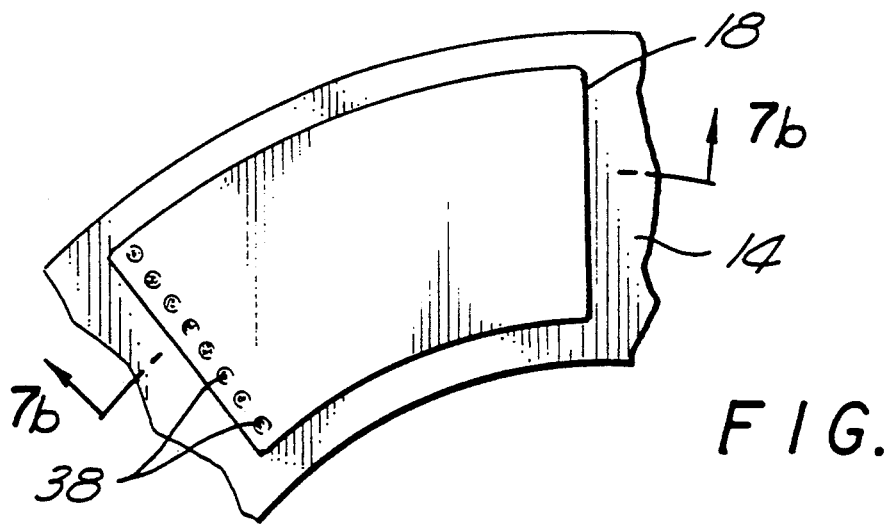
FIG. 7a is a fragmentary plan view of a spring cluster disc on which foil pads are connected in an arrangement which contemplates elimination of the stiffener disc shown in FIG. 1.
Figure 7B:
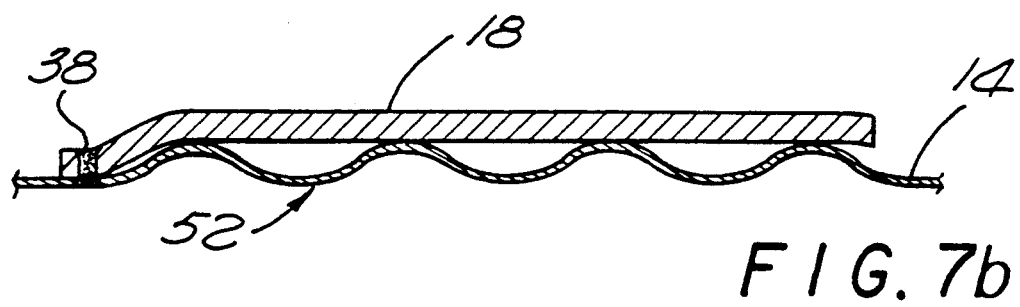
Figure 7C:
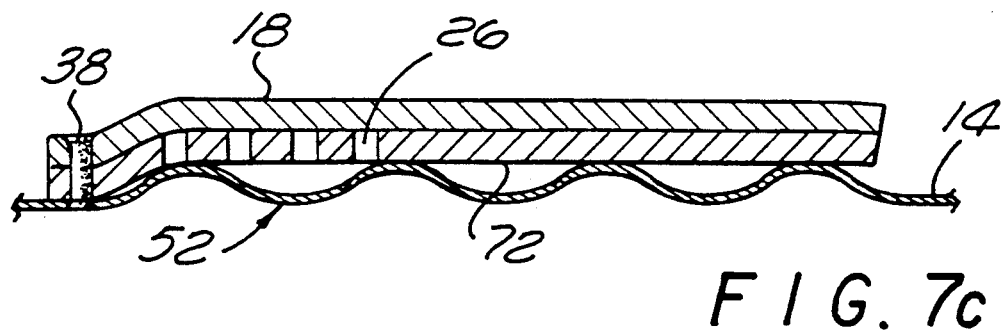
FIGS. 7c and 7d are views similar to that of FIG. 7b, and illustrate design alternatives.
Figure 7D:
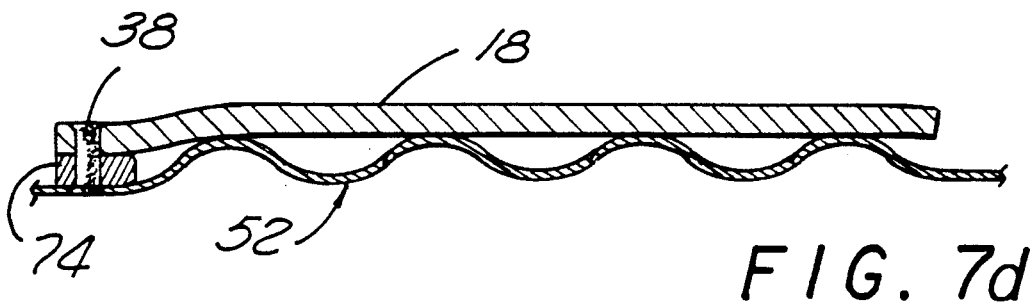

FIGS. 7a–7d illustrate embodiments in which the foils 18 are connected directly to the spring cluster 14, with each being overlaid on a respective spring set 52, thus eliminating the need for the stiffener 12 (FIG. 1). In FIG. 7c, an intermediate pad 72 conformal with the foil 18 is interposed between and connected with the foil and its respective spring set 52, with the apertures 26 being used to increase compliance. The embodiment of FIG. 7d contemplates the need for a spacer 74 to raise the leading edge of the foil 18 in cases where the height "h" of the corrugations otherwise may cause undesired deformation of the foil near its leading edge.

Although the illustrated embodiments provide limited resolution in gradation of stiffness, the provision of an increased resolution which more closely approximates the pressure profile in a given application is within the ambit of the invention. The foregoing portion of the description is intended to serve a pedagogical purpose, and is not intended to restrict the invention to specifically described or illustrated details which are ancillary to the teaching contained herein.

What is claimed is:

1. A spring cluster disc for a foil thrust bearing; the disc defining an axis thereof and comprising a spaced, circumferentially extending plurality of spring sets in collectively annular positional relation; the sets being structurally adapted to provide stiffness variation such that, in a circumferential direction, both radial and circumferential stiffness first increases and then decreases.

2. The invention of claim 1 further comprising in combination with the disc:
a plurality of substantially trapezoidal pads connected to the disc, each being overlaid on a respective spring set.

3. The invention of claim 1 wherein each spring set comprises a spring member having a plurality of slots formed therethrough; each slot having a respective radial dimension, and the stiffness variation being effected by variation in the radial dimension of the slots.

4. The invention of claim 3 wherein each spring set consists of the spring member.

5. The invention of claim 3 wherein the spring member is corrugated to form a plurality of corrugations; the slots being formed through crest of the corrugations.

6. The invention of claim 1 wherein each spring set comprises an arcuate spring member having a plurality of slots formed therethrough; the slots being arranged in a plurality of alignments thereof, each of the alignments comprising a respective number of the slots, and the stiffness variation being effected by variation in the number of slots in the alignments.

7. The invention of claim 4 wherein each spring set consists of the spring member.

8. The invention of claim 4 wherein the spring member is corrugated to form a plurality of corrugations, the slots being formed through crests of the corrugations.

9. The invention of claim 1 wherein each spring set comprises a spring member having a plurality of slots formed therethrough; each slot having a respective radial dimension; the slots being arranged in a plurality of alignments thereof; each of the alignments comprising a respective number of the slots, and the stiffness variation being effected by variation in both the radial dimension and number of slots in the alignments.

10. A foil thrust bearing, comprising in combination:
a first disc having a plurality of foils connected thereto;
a second disc coaxial with and having a surface adapted to face the first disc; the surface defining a dimensionally common plurality of spaced and arcuately extending trapezoidal regions; each region subtending an angle extending in a first circumferential direction from a respective first radial-line segment defining a respective first circumferential border of the region to a respective second radial-line segment defining a respective second circumferential border of the region; each region extending in a radial direction from a radially inner line defining a first radial border of the region to a radially outer line defining a second radial border of the region; the regions being registered with the foils as determined in a circumferential direction; and
within each of the regions, a set of springs connected to or integral with the second disc; each set being configured to provide stiffness variation such that, in a circumferential direction, both radial and circumferential stiffness first increases and then decreases.

* * * * *